United States Patent
Oikawa et al.

(10) Patent No.: US 7,583,307 B2
(45) Date of Patent: Sep. 1, 2009

(54) AUTOSTEREOSCOPIC DISPLAY

(75) Inventors: Michio Oikawa, Sagamihara (JP);
Takafumi Koike, Sagamihara (JP);
Tsuyoshi Minakawa, Paris (FR);
Masami Yamasaki, Sagamihara (JP);
Hideyuki Sakai, Yokohama (JP)

(73) Assignee: Hitachi Displays Ltd., Chiba (JP)

( * ) Notice: Subject to any disclaimer, the term of this patent is extended or adjusted under 35 U.S.C. 154(b) by 645 days.

(21) Appl. No.: 11/286,195

(22) Filed: Nov. 22, 2005

(65) Prior Publication Data

US 2006/0132916 A1 Jun. 22, 2006

(30) Foreign Application Priority Data

Dec. 7, 2004 (JP) ............................ 2004-353966

(51) Int. Cl.
*H04N 5/222* (2006.01)
(52) U.S. Cl. .................. 348/333.01; 348/51; 345/426
(58) Field of Classification Search ........... 348/333.01, 348/46, 51, 333.02; 345/6, 426, 53; 359/463
See application file for complete search history.

(56) References Cited

U.S. PATENT DOCUMENTS

| | | | | |
|---|---|---|---|---|
| 5,519,533 | A * | 5/1996 | Nomura et al. | 359/478 |
| 5,541,641 | A * | 7/1996 | Shimada | 348/58 |
| 5,678,089 | A * | 10/1997 | Bacs et al. | 396/324 |
| 6,999,110 | B2 * | 2/2006 | Kobayashi | 348/51 |
| 7,180,478 | B2 * | 2/2007 | Hamagishi et al. | 345/32 |
| 2003/0048354 | A1 * | 3/2003 | Takemoto et al. | 348/51 |
| 2004/0130503 | A1 * | 7/2004 | Hamagishi et al. | 345/6 |

FOREIGN PATENT DOCUMENTS

JP 2003-169351 A 6/2003

OTHER PUBLICATIONS

Lippmann "La photographie integrale," Comptes-Rendus Academie des Sciences 146:446-451 (1908).
Javidi et al. *Three-Dimensional Television, Video, and Display Technologies* Springer-Verlag New York, LLC p. 118 (2002).
Tardif et al. "Multi-projectors for arbitrary surfaces without explicit calibration nor reconstruction," Proceedings of the Fourth International Conference on 3-D Digital Imaging and Modeling (3DIM '03) p. 217-224 (2003).

* cited by examiner

*Primary Examiner*—David L Ometz
*Assistant Examiner*—Ahmed A. Berhan
(74) *Attorney, Agent, or Firm*—Townsend and Townsend and Crew LLP

(57) ABSTRACT

In a stereoscopic display system, comprising a display and a lens array, it is difficult to manufacture the lens array with lens spacing at high accuracy as designed, and it is also difficult to attain high installation accuracy when the display and the lens array are combined together.

An image of a stereoscopic display 27 with a display 1 and a lens array 2 integrated with each other is taken by a camera 3, and a positional relation of each pixel of the display 1 and each lens center of the lens array 2 is determined by a measuring system 4. Based on the matching positional relation information of the lenses and the pixels thus acquired, a stereoscopic image generating/outputting system 12 generates a stereoscopic image and supplies the image to the stereoscopic display 27.

10 Claims, 12 Drawing Sheets

AUTOSTEREOSCOPIC DISPLAY

BACKGROUND OF THE INVENTION

The present invention relates to a system for providing a stereoscopic view. In particular, the invention relates to an autostereoscopic display, by which a user can have a stereoscopic view through naked eyes.

With rapid progress to attain higher resolution of display and with incessant improvement of the technique to manufacture micro-size lenses in recent years, attention in the market is now focused on a stereoscopic display for naked eyes through utilization of integral photography mode ("IP mode") as described in: M. G. Lippmann: Epreuves reversibles donnant la sensation du relief", J. de Phys., vol. 7, 4th series, pp. 821-825, November 1908 (hereinafter referred as "Non-Patented Reference 1"). A stereoscopic display system for multiple eyes is also known, which gives stereoscopic effect only in lateral direction by using renticular lens and parallax barrier.

In these stereoscopic display systems, it is important to have accurate positioning of display system, lens array, and parallax barrier. A technique to adjust the position of images in alignment with the position of parallax barrier is disclosed, for instance, in JP-A-2003-169351 (hereinafter referred as "Patented Reference 1").

There is also a problem in that a position of a pixel display is to be obtained as original information for the positioning. A technique to provide spatial coating by the image displayed is described in: J-P Tardif, S. Roy and M. Trudeau: "Multi-projectors for arbitrary surfaces without explicit calibration nor reconstruction"; Proceedings of the Fourth International Conference on 3-D Digital Imaging and Modeling (3DIM '03), pp. 217-224, (2003) (hereinafter referred as "Non-Patented Reference 2").

SUMMARY OF THE INVENTION

First, description will be given on IP mode referring to FIG. 16 and FIG. 17. A lens array 2 with a convex lens arranged on the array is installed in front of a display system 1. FIG. 16 shows stereoscopic positional relation, and a cross-section of it is given in FIG. 17.

If it is supposed that pixel on the display is very small compared with the lens, and when only the pixel at a position given by an open circle 36 in FIG. 17 is displayed in a certain color and brightness on the display 1, light components are converted to the position shown by the open circle 36 due to the effect of the lens array 2, and rays are spread from this position.

When an observer 23 observes this within the range of the field of view 35, the observer perceives as if a point light source (i.e. an object) is present at the position of the open circle 36. A pinhole may be used instead of the lens.

In this case, the rays cannot be ideally reproduced as shown in FIG. 16 and FIG. 17 unless positional relation of each lens and each pixel of the lens array 2 and the spacing of each of the lenses are accurately represented.

According to the technique disclosed in the Patented Reference 1, it is assumed that pitch of parallax barrier is accurately aligned with pixels. However, there arises a problem in that it is difficult to achieve accurate pitch to concur with pixels when micro-size convex lens array to be used in IP mode is produced.

For instance, when one lens is to be assigned to "m×n" pixels, the lens pitch in lateral direction must be "mp" and the lens pitch in longitudinal direction must be "nq" if pixel size is "p×q" [μm]. In the liquid crystal display currently in use, the unit of accuracy of "mp" and "nq" must be in the unit of 1 μm or 0.1 μm. To manufacture a lens array with such accuracy, very high technical skill is needed, and this leads to higher production cost.

It is possible to produce the lens array at lower cost by decreasing the accuracy. When such lens array is used, there arises a problem that a stereoscopic image cannot be correctly displayed.

In order to display a stereoscopic image by using a lens array with uneven and inaccurate lens spacing, it is necessary to determine the relation as to which position of the pixel the lens center matches with.

In the Non-Patented Reference 2, pixels displayed by a projector can be directly measured by a camera. However, in a stereoscopic display of IP mode, there is a problem in determining the positional relation between lens and pixel, and this problem cannot be solved.

To solve the above problems, it is an object of the present invention to provide a technique to accomplish correct stereoscopic display by generating a stereoscopic image corresponding to positional relation of actual display and the lens array for each pixel through the use of information on positional relation of lens-pixel matching.

The lens-pixel matching positional relation information can be obtained by a processing to take an image of a set of a display and a lens array integrated with each other by using a camera and to estimate from the relation of external configuration of the display and the position of lens center, and also by a processing to use plural image information by taking an image of a plurality of image display patterns from a position aligned with optical axis of lens and to obtain the entire relation through interpolation.

Also, a stereoscopic image can be generated by a processing to generate a stereoscopic image using ray tracing based on 3-dimensional data by using lens-pixel matching positional relation information and by a processing to generate stereoscopic image through interpolation from image of plural viewpoints.

DESCRIPTION OF THE PREFERRED EMBODIMENTS

When a position of a lens is different from the position as designed, positional relation between actual lens position and a pixel on display is obtained. By utilizing the positional relation information on lens-pixel matching thus obtained, correct image for stereoscopic view is generated and is displayed. To attain the purpose, the present invention provides an autostereoscopic display, which comprises a measuring system, a stereoscopic image generating system and a stereoscopic image outputting system (hereinafter referred as "stereoscopic image generating/outputting system").

Embodiment 1

Figure 1:
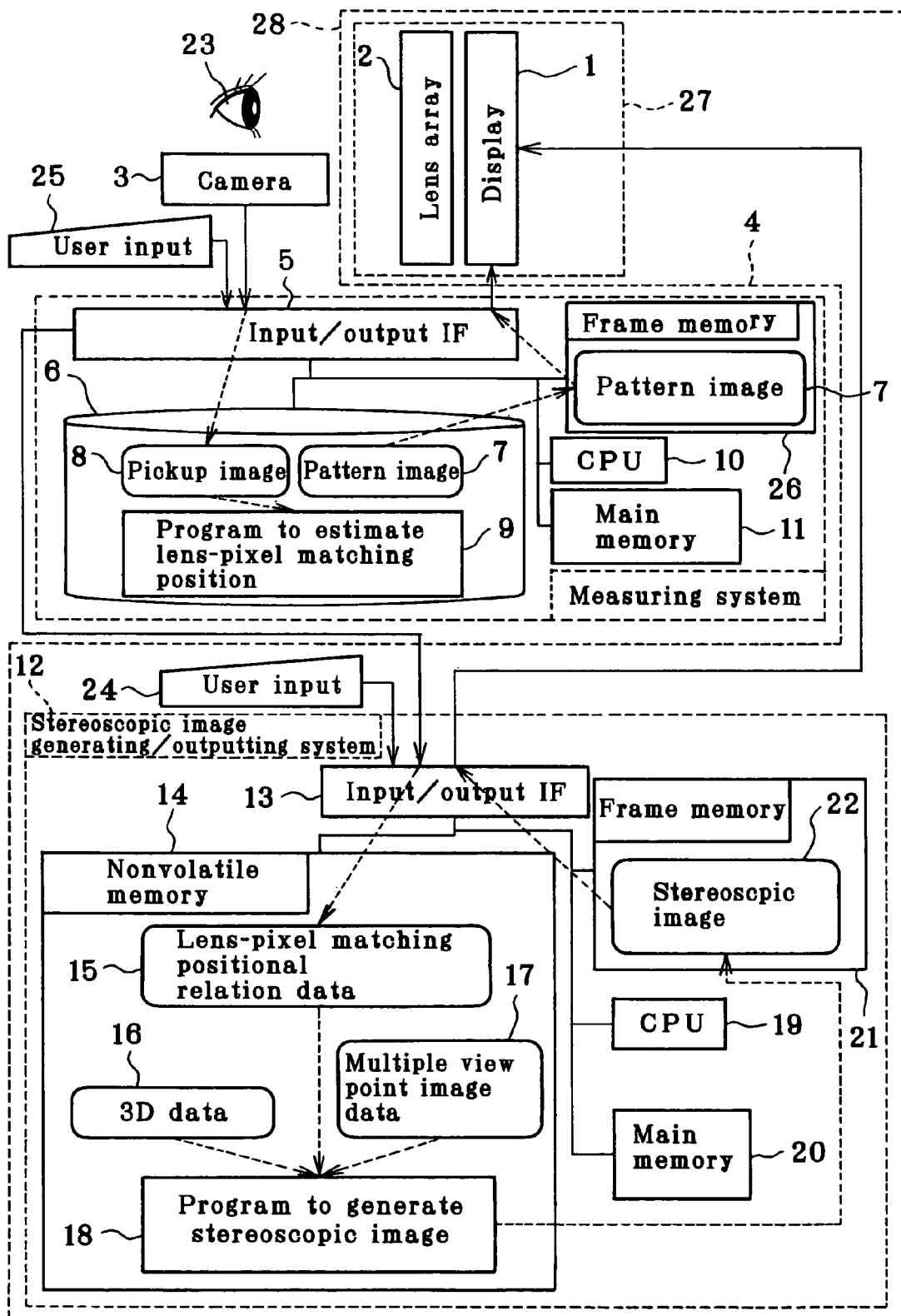
FIG. 1 is a block diagram of an autostereoscopic display and of a measuring system.

FIG. 1 is a block diagram of Embodiment 1. In the figure, a dotted arrow mark shows a conceptual data flow. A stereoscopic display 27 is a combination of a display 1 for displaying an ordinary type 2-dimensional image and a convex lens array 2. An observer 23 observes the stereoscopic display 27 from the direction of the convex lens array 2.

First, relation between lens and pixel on the stereoscopic display 27 is obtained by using a measuring system 4. In a storage unit 6 of the measuring system 4, a pattern image 7 for measurement is stored. In response to an input from a user input unit 25, the pattern image 7 is loaded to a frame memory 26 via OS (operating system), and the pattern image 7 is displayed on the display 1 via an input/output IF (interface).

A camera 3 is used to take the image displayed on the display 1 via the lens array 2. The image thus taken is stored in the storage unit 6 via the input/output IF 5 as a pickup image 8. Then, a program 9 to estimate lens-pixel matching position is read in a main memory 11 via OS by the user input unit 25 or according to a predetermined timing, and it is executed by a CPU 10.

Here, the CPU 10 is an arithmetic unit and may comprise a plurality of processors. Also, it may be DSP (digital signal processor) or a GPU (graphics processor unit).

The information on lens-pixel matching positional relation obtained by the program 9 to estimate lens-pixel matching position is written in a nonvolatile memory 14 of the stereoscopic image generating/outputting system 12 via the input/output IF 5. Then, it is written as a lens-pixel matching positional relation data 15 via an input/output IF 13.

It may be designed in such manner that the lens-pixel matching positional relation data 15 is temporarily stored in the storage unit 6 of the measuring system 4, and it is later written to the nonvolatile memory 14 of the stereoscopic image generating/outputting system 12.

The stereoscopic image (may be a still image or a moving image) to be displayed on the stereoscopic display 27 is generated by the stereoscopic image generating/outputting system 12 and is displayed on the display 1.

At the stereoscopic image generating/outputting system 12, the lens-pixel matching positional relation data 15 obtained by the measuring system 4 is stored in the nonvolatile memory 14. In this case, the nonvolatile memory 14 may be of non-rewritable type such as ROM or may be of rewritable type such as hard disk.

In the nonvolatile memory 14, a 3D data 16 serving as a source to generate the stereoscopic image, a multiple viewpoint image data 17, and a stereoscopic image generating program 18 for generating the stereoscopic image from these data are recorded.

By the stereoscopic image generating program 18, the 3D data 16 or the multiple viewpoint image data 17 are read in the main memory 20 as appropriate via OS in accordance with the input from the user input unit 24 or according to a predetermined timing, and these are processed by the CPU 19.

As a result, the stereoscopic image 22 thus generated is written in the frame memory 21. It is then sequentially sent to the display 1 via the input/output IF 13 and is displayed.

In this specification, a combination of the stereoscopic image generating/outputting system 12 and the stereoscopic display 27 is called by a term "autostereoscopic display" 28. The stereoscopic image generating/outputting system 12 and the stereoscopic display 27 may be integrated with each other or may be separately furnished.

Figure 2:
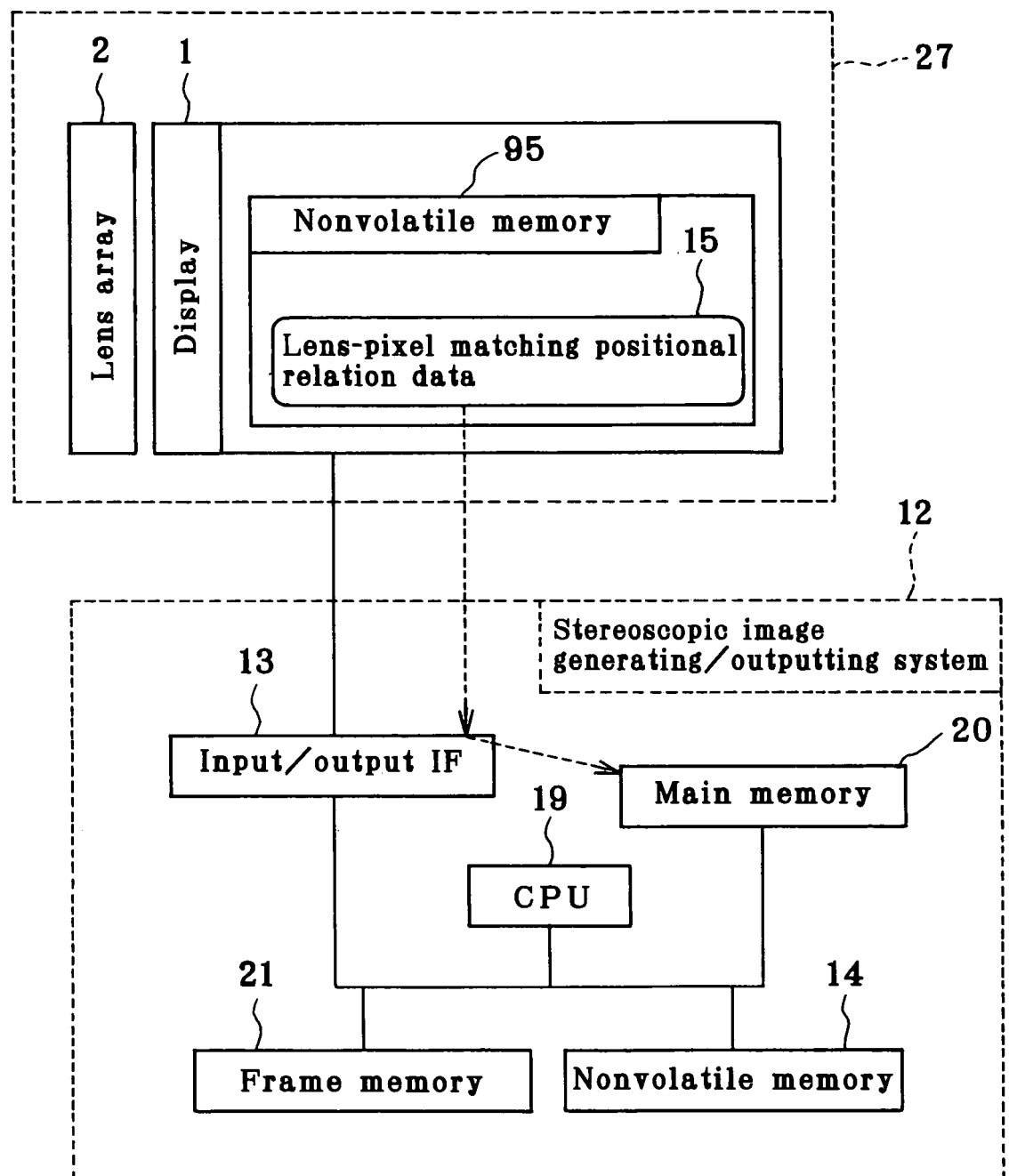
FIG. 2 is another block diagram of the autostereoscopic display shown in FIG. 1.

As shown in FIG. 2, it may be designed in such manner that a nonvolatile memory 95 is provided in the display 1 and the lens-pixel matching positional relation data 15 is stored in it, and that the stereoscopic image generating/outputting system 12 acquires the lens-pixel matching positional relation data 15 via the input/output IF 13 and generates the stereoscopic image.

Next, description will be given on a flow of processing for stereoscopic display in the present embodiment referring to FIG. 3. First, description will be given on the processing at the measuring system 4 to obtain the lens-pixel matching positional relation data 15.

For the purpose of obtaining a matching position of the lens center and the pixel on the display 1 from an image taken by a camera 3, the following data are required: image-taking conditions of the camera 3 (position of ideal viewpoint, field angle, and resolution), positional relation between the pixel on the display 1 and the camera 3, distance between the display 1 and the lens array 2, and position of the lens center in the image taken by the camera 3. Detailed description will be given below:

First, distortion of the image taken by the camera 3 is corrected (Step S1). The distortion of the image can be corrected by taking an image of a known pattern by conventional technique. In addition to geometrical distortion, distortion should include the correction of color distortion including brightness correction.

Next, positional relation between the camera 3 and the stereoscopic display 27 is measured or estimated (Step S2). Basically, it is desirable to arrange so that a straight line passing through the center of the display 1 and running perpendicularly to the display 1 is aligned with optical axis of the camera 3. By providing a jig to fix the display 1 and the camera 3 at a fixed positional relation, a plurality of stereoscopic displays 27 can be efficiently measured.

Or, it is possible to measure 3-dimensinal positional relation of the display 1 and the camera 3 by using a 3-dimensional measuring instrument utilizing light or the like.

Another method is to obtain field angle of the camera 3 in advance. From external configuration of the display 1, the relation between the camera 3 and the display 1 can be estimated.

Figure 4:
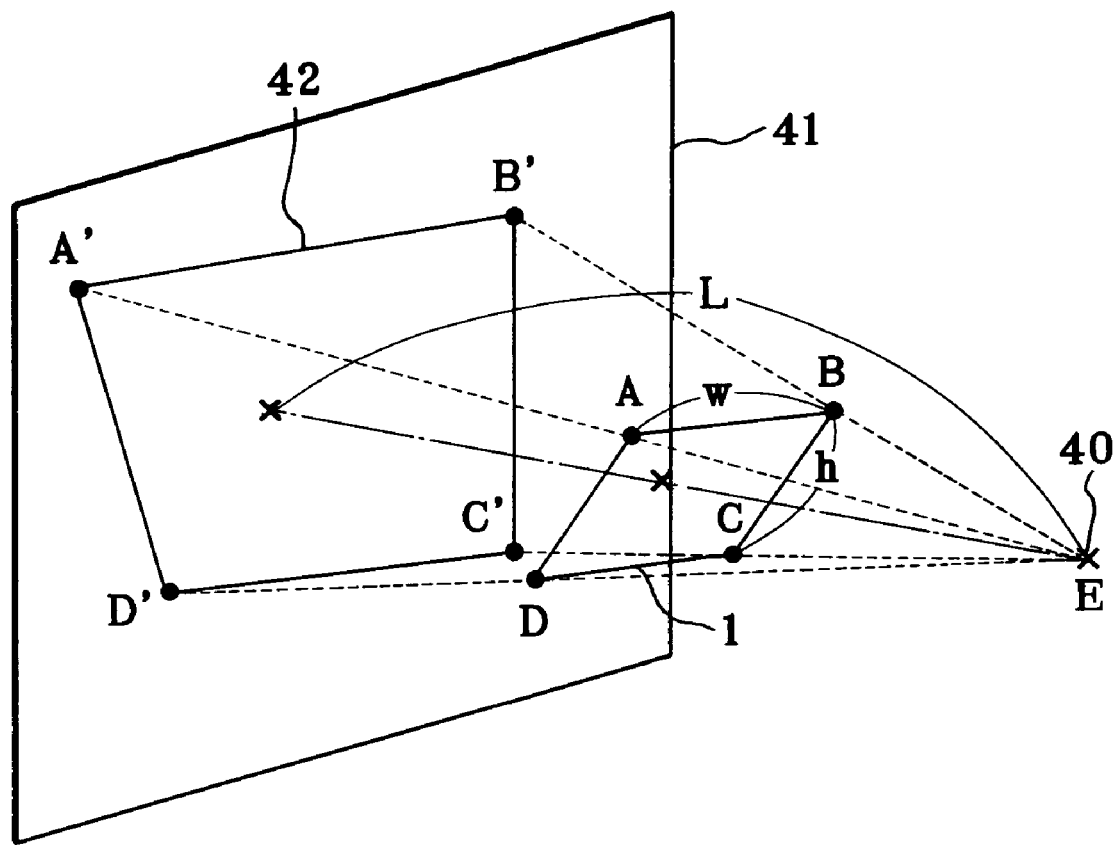
FIG. 4 is a view when configuration of the display is projected on a projection plane from an ideal viewpoint of a camera.

Now, description will be given on measurement or estimation (Step S2) referring to FIG. 4. It is assumed that the external configuration of the display on the image taken is in rectangular shape, and actual dimension of each side is already known, i.e. lateral dimension is "w" and longitudinal dimension is "h". The field angle of the camera 3 is obtained in advance, and it is assumed that an ideal viewpoint E (40 in FIG. 4) is used an origin and a distance to a projection plane 41 is L. Then, an image taken by the camera 3 has a configuration 42 with the display 1 projected on the projection plane 41, and its size is determined.

If it is supposed that vertexes of the display 1 are A, B, C, and D respectively, and that the projections of these vertexes are A', B', C' and D' respectively, coordinate values of the points A', B', C', and D' can be obtained from the image taken. Thus, the points A, B, C and D can be given by the following formulae:

$$\overline{EA} = {}_s EA'$$
$$\overline{EB} = {}_t EB'$$
$$\overline{EC} = {}_u EC'$$
$$\overline{ED} = {}_v ED' \qquad [\text{Formulae 1}]$$

Because the display 1 is supposed to be in rectangular shape, the relations given by the following formulae exist:

$$\overline{AB} \cdot \overline{AD} = 0$$
$$\overline{BA} \cdot \overline{BC} = 0$$
$$\overline{CB} \cdot \overline{CD} = 0 \qquad [\text{Formulae 2}]$$

Further, length of each of the side of the display 1 is known, and the following formulae is given:

$$\overline{AB} = w$$
$$\overline{BC} = h \qquad [\text{Formulae 3}]$$

However, the values of s, t, u, and v are not known. By obtaining these values by using the relation of the formulae 1, 2 and 3, coordinate values of the points A, B, C and D can be determined. Also, it is possible to find out positional relation between the camera 3 and the display 1. This means that position of the pixel on the display and positional relation with the camera 3 are now known.

Again, description will be given referring to the flow chart of FIG. 3. After positional relation between the camera and the display 1 has been obtained in Step S2, the pattern image 7 is displayed on the display 1, and its image is taken by the camera 3 (Step S3).

In this case, an information should be kept, which indicates as to which of the pattern images 7 has been taken. For instance, when a pickup image 8 is stored in the storage unit 6, it is stored in the same name as the pattern image 7 displayed in a directory different from the pattern image 7.

Or, a table may be stored in the storage unit 6, i.e. a table, in which the name of the pattern image 7 is matched with the name of the pickup image 8.

Next, the positional relation between lens and pixel is estimated from the pickup image 8 (Step S4), and the lens-pixel matching positional relation data 15 is prepared.

Detailed description will be given on Step S4 by referring to FIG. 5. In this embodiment, it is assumed that the pattern image 7 taken in Step S3 is an image with the entire screen of the display 1 displayed in white. As the display 1, it is recommended to use a display, in which an entire pixel is displayed in a single color so as not to make the black mask conspicuous. For this purpose, a liquid crystal display of field sequential type is used or the colors of RGB are mixed up and an optical filter is placed in front of sub-pixels of RGB or the display is arranged by changing the focal length of the lens array.

Also, a non-lens unit is present between the lenses of the lens array 2, and light-shielding processing (such as masking by black) is performed.

Figure 5:
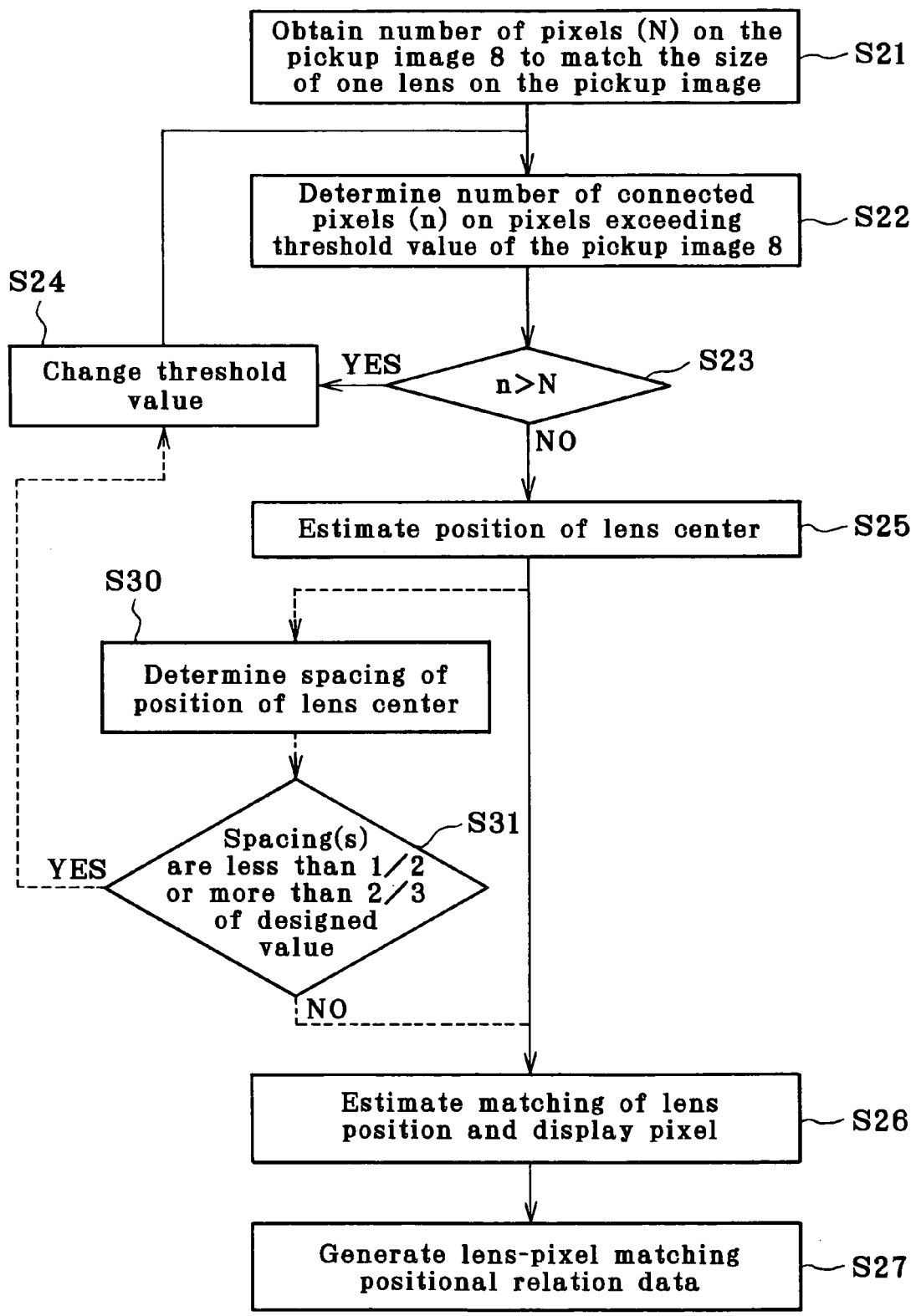
FIG. 5 is a flow chart showing the details of Step S4 in FIG. 3.

First, as shown in FIG. 5, in the pickup image 8, number of pixels (N) to match with the size of one lens of the lens array 2 is obtained (Step S21). This can be approximately calculated from the design value of diameter of the lens array 2, from positional relation of the display 1 and the ideal viewpoint of the camera as determined in Step S2, and from the specification on the size of pixel of the display 1.

Next, a threshold value is set up for each of the pixels of the pickup image 8. If a pixel exceeding the threshold value is present at an adjacent position, it is treated as a single lens region, and number of pixels (number of connected pixels) (n) to form each lens region is determined (Step S22).

In case the number of connected pixels (n) is more than the number of pixels (N) (Step S23), the threshold value is changed to a higher value (Step S24). Then, go back to Step S22. This change may be inputted from the user input unit 25 of the measuring system 4, or the threshold value may be automatically changed at a predetermined rate.

In case the number of connected pixels (n) is less than the number of pixels (N), the position of the lens center is estimated by using a weighted average of brightness values of the pixels, which constitute the lens region (Step S25). Now, description will be given on the estimating method referring to FIG. 6.

Figure 6:
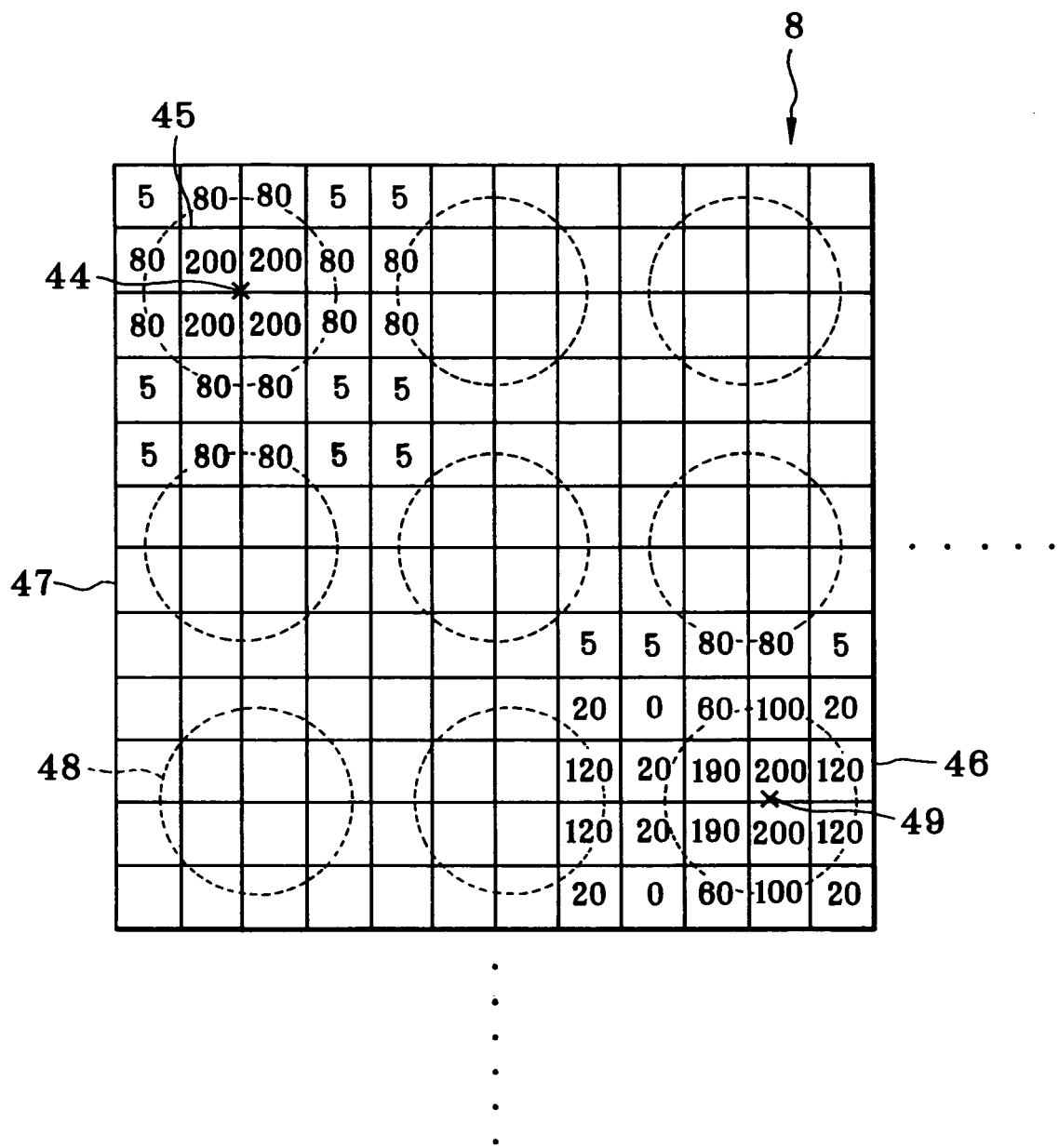
FIG. 6 gives a view when the stereoscopic display is taken by a camera.

FIG. 6 shows an example of a part of the image 8 obtained by taking the pattern image 7. Each of squares 47 represents a pixel of the pickup image 8, and it is supposed that each of the dotted circles represents a region where the lens is taken. Brightness values of the pixels of the pickup image 8 are given in a part of representative pixels.

In this case, if it is supposed that the threshold value in Step S22 in FIG. 5 is 100. Then, in the region on upper left portion of FIG. 6, the region enclosed by thick lines 45 is judged as the lens region. In the region on lower right portion, the region enclosed by thick lines 46 is judged as the lens region.

In this example, the number of pixels (N) to match with one lens is 7. It is assumed that the brightness value of the pixel i within the lens region (pixels within the lens region are numbered as 1 to m) is $g_i$, and that the coordinate value is $(x_i, y_i)$. Then, the position of the center in the lens region is obtained by the following formula 4:

$$\left( \frac{\sum_{i=1}^{m} g_i x_i}{\sum_{i=1}^{m} g_i}, \frac{\sum_{i=1}^{m} g_i y_i}{\sum_{i=1}^{m} g_i} \right) \qquad [\text{Formula 4}]$$

Next, the matching of the position of lens center obtained in the above with the pixels of the display is estimated in FIG. 5 (Step S26). This is explained by using FIG. 7, which represents a cross-section of the region shown in FIG. 4.

Figure 7:
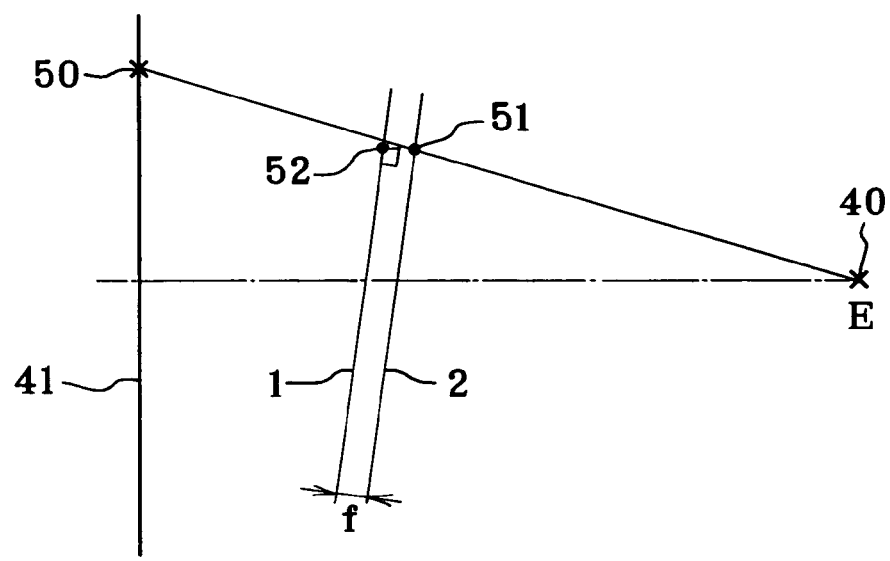
FIG. 7 is a cross-sectional view of positional relation of the ideal viewpoint of camera and the projection plane and the stereoscopic display.

In the pickup image 8 on the projection plane 41 shown in FIG. 7, it is supposed that the position of a point 50 is the position of the lens center estimated in Step S25.

Figure 3:
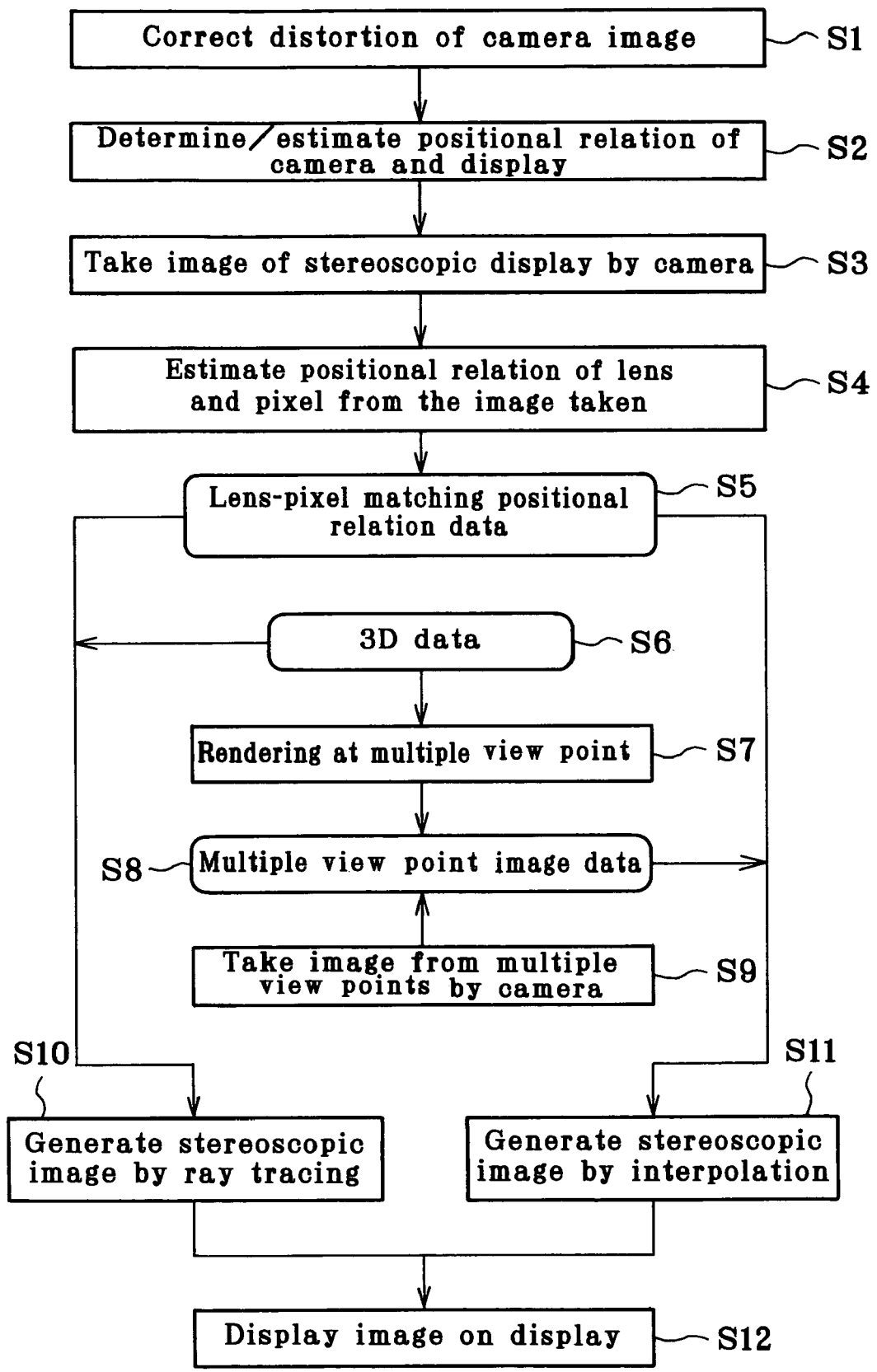
FIG. 3 is a flow chart of a processing when stereoscopic display is given by the system of FIG. 1.

Because the lens array 2 is placed in parallel to the display 1 at a position separated by a distance f, the relation between the camera 3 and the display 1 is determined in Step S2 of FIG. 3. Thus, a plane including bottom surface of the lens array 2 can be obtained.

Then, an intersection 51 of a straight line connecting the lens center 50 with the ideal viewpoint E of the camera 3 (40 in FIG. 7) and a plane including the lens array 2 can be obtained. Now, it is supposed that a point 52 determined by a perpendicular drawn from the intersection 51 to the display 1 is the position of the pixel to match with the lens center 50.

Figure 8:
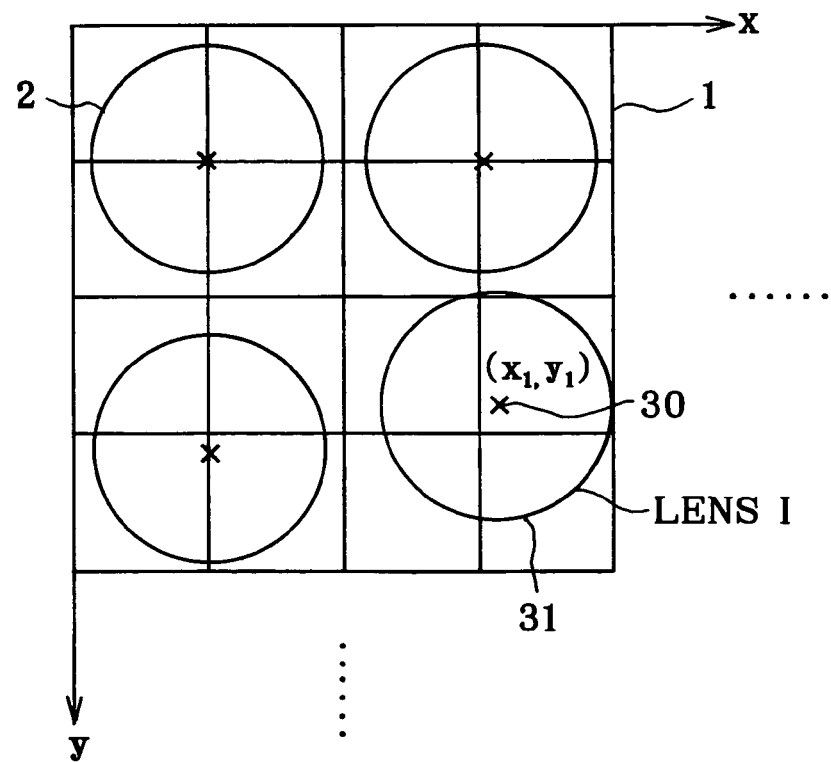
FIG. 8 is a drawing to show the relation between lenses and pixels on the display.

Finally, the matching positional relation data 15 of the lens and the pixel obtained in the above is generated in FIG. 5 (Step S27). For instance, in case where four pixels of the display 1 match with one lens of the lens array 2 as shown in FIG. 8, it is supposed that a lens I obtained from the pickup image (lenses in the lens region are sequentially numbered; 31 in FIG. 8) has a data in a table where coordinate value xy of the matching pixel to match the lens number I is stored, and the lens center 30 is at the coordinate $(X_1, Y_1)$ in the xy coordinate system of the pixels of the display 1.

Or, it may be a table where only the coordinate values of the matching pixels are sequentially stored. In the example shown in FIG. 8, lenses are aligned in square lattices, while the lenses may be aligned in any arrangement, e.g. the closest filling arrangement or delta arrangement where lenses are shifted by ½ of the lens spacing in lateral direction between upper and lower columns. Also, delta arrangement may be adopted if the positions of pixels of the display 1 are known.

It is not necessary to perform the measurement of the lens-pixel matching positional relation data 15 by the measuring system 4 once it is done so far as there is no change in the positional relation.

The lens-pixel matching positional relation data 15 is specific to each of the stereoscopic displays 27. When the stereoscopic displays 27 are shipped, the lens-pixel matching positional relation data 15 stored in the storage medium are shipped as a set, and the information on serial number of the stereoscopic displays 27 should be stored in the lens-pixel matching relation data 15.

In case PC is used as the stereoscopic image generating/outputting system 12, the lens-pixel matching positional relation data 15 should be installed with driver software stored in the storage medium when it is connected with the stereoscopic display 27.

In this case, it should be designed so that serial number of the stereoscopic display 27 can be confirmed through the driver. Then, it is possible to check whether it is a lens center position data to match with the stereoscopic display 27 or not. This is helpful to prevent the generation of a stereoscopic image based on incorrect information.

In the present embodiment, it is assumed that the measurement is made by using a single camera. If a lens array with a non-lens unit of 100 μm in width is measured and if image is taken with lens spacing of 1 pixel, it is possible to take an image of a screen up to 16 inches when a digital camera of 8M pixels as currently in use is employed.

In case a larger screen is used or a finer image is to be taken, two or more cameras should be used or the image can be taken by shifting the position of the camera.

When the stereoscopic display is measured from two or more camera positions, good matching must be kept between the images for lenses. External frame of the display should be marked or only the pixel to match with more than one lenses should be displayed brighter, and good matching should be kept to take images by changing the camera position within the range where no change occurs in the matching relation between pixel and lens.

In the present embodiment, it is assumed that there is a non-lens unit, while a lens array with the lenses attached with each other may be used. Because the brightness is lower at peripheral portion of the lens than at the lens center, one lens region may be divided by a threshold value. Further, depending on the variation in brightness, one lens region may be divided.

Next, description will be given on the processing in the autostereoscopic display 28 of FIG. 1 referring to the flow chart of FIG. 3. In the stereoscopic image generating/outputting system 12, at least the 3D data 16 or the multiple viewpoint image data 17 are kept in the nonvolatile memory 14 as the source of the contents.

First, when the stereoscopic image 22 is generated by using the 3D data 16, the stereoscopic image 22 is generated by using ray tracing (Step S10), and it is displayed on the display 1. Now, description will be given on Step S10 referring to FIG. 9.

First, from the lens-pixel matching positional relation data 15 and from the design value for the number of pixels to match with one lens, the number of the lens is obtained, with which each pixel on the display 1 is to match. For instance, the number of matching pixels as designed should be assigned from the pixel closest to the lens center in the pixel coordinate system.

Next, a ray connecting the lens center with the center of pixel is considered for each pixel. For instance, for a pixel 55 in FIG. 9, a ray 58 connecting the center of the pixel 55 with a lens center 30 to match with the pixel is considered. Here, it is assumed that a 3-dimensional rectangular parallelepiped 57 defined in the 3D data 16 is stereoscopically displayed.

In this case, color and brightness of a point 56 on a surface closest to the observer on the ray 58 are obtained, and these are displayed on the pixel 55. By performing the calculation based on ray tracing as described above for all of the pixels, a stereoscopic image 22 can be generated.

In order to generate the stereoscopic image by the present embodiment, calculation at very high speed is required. Thus, two or more CPUs 19 may be provided in the stereoscopic image generating/outputting system 12 of FIG. 1. Calculation may be made by using DSP or by using processors (GPU) on graphics board.

According to the present embodiment, even when lens pitch of the lens array may be deviated from the design value, it is possible to generate the stereoscopic image so that a 3-dimensional object can be placed at a correct position. Also, by changing 3D data via the user input unit 24, it is possible to achieve the contents associated with user interaction.

Embodiment 2

As Embodiment 2, description will be given on a case where the multiple viewpoint image data 17 is generated from the 3D data 16 in the flow chart of FIG. 3 and a stereoscopic image is approximately generated.

The multiple viewpoint image data 17 is prepared by the rendering as an image of two or more viewpoints from the 3D data 16 (Step S7). Description will be given on an embodiment of this rendering referring to FIG. 10. In this embodiment, parallel projections are used by assuming that the viewpoint is at infinity. The projection plane is fixed to facilitate the generation of the stereoscopic image.

Figure 10:
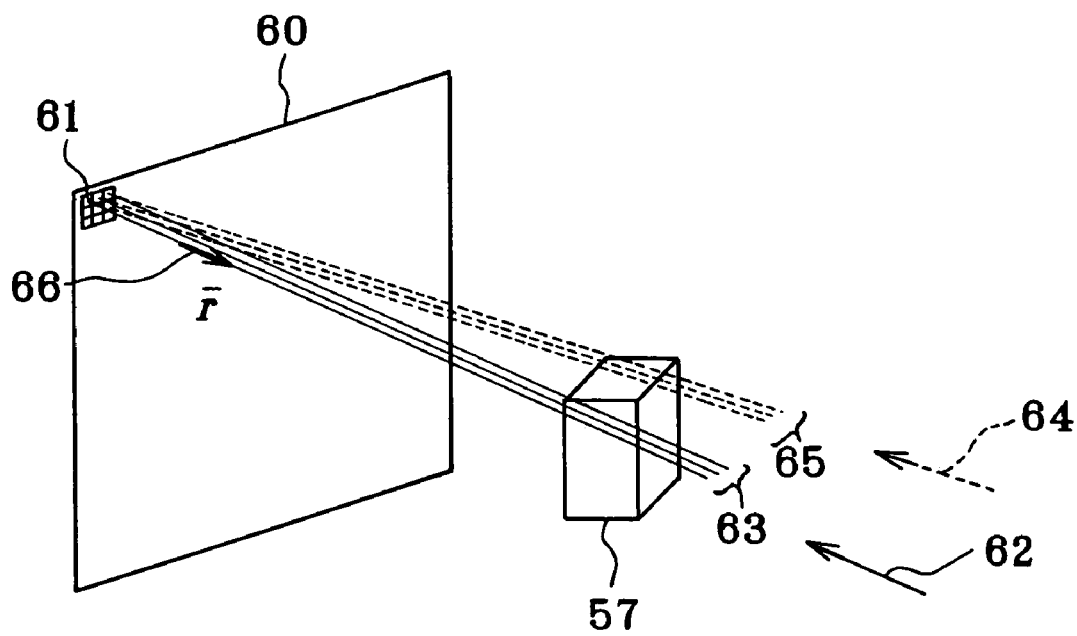
FIG. 10 is a drawing to explain how images at multiple viewpoints are generated from 3-dimensional data.

First, in FIG. 10, a projection plane 60 is determined to match with the resolution of the display. Next, based on the 3D data 16, a 3-dimensional object 57 is placed at a position where the stereoscopic display is to be given.

Parallel rays 63 in projecting direction 62 as designated are defined for each pixel 61 on the projection plane 60. Color and brightness on the surface of the 3-dimensional object 57 at the furthest position from the projection plane 60 along the ray 63 are defined as pixel values, and parallel projection rendering is performed.

The image prepared by the parallel projection is one of the multiple viewpoint images 17, and this is stored in the nonvolatile memory 14 together with a unit vector 66 in a direction opposite to the projecting direction.

When an image from another viewpoint is to be generated, the projecting direction is set to a projecting direction 64, for instance, while the position of the projection plane 60 is fixed, and a projection image from another viewpoint is prepared by the ray 65.

Regarding the number of viewpoints, it is desirable to set to more than the number of pixels to match with at least one lens. For instance, it is desirable to prepare images for more than 9 viewpoints in case 3×3 pixels are to be matched with.

The rendering of the multiple viewpoint image 17 as described above may be carried out by the stereoscopic image generating/outputting system 12, while it may be designed in such manner that the multiple viewpoint image data prepared by the rendering using another system may be stored in the nonvolatile memory 14.

The amount of data is increased in case of moving picture data, and the data may be stored by compressing. It is desirable to use reversible compression when priority should be given on the image quality.

Next, in FIG. 3, the stereoscopic image 22 is generated by interpolation from the multiple viewpoint image 17 and the lens-pixel matching positional relation data 15 (Step S11). When the multiple viewpoint image 17 is compressed, the stereoscopic image may be generated by using an extended image. This is explained by referring to FIG. 9 and FIG. 10.

Figure 9:
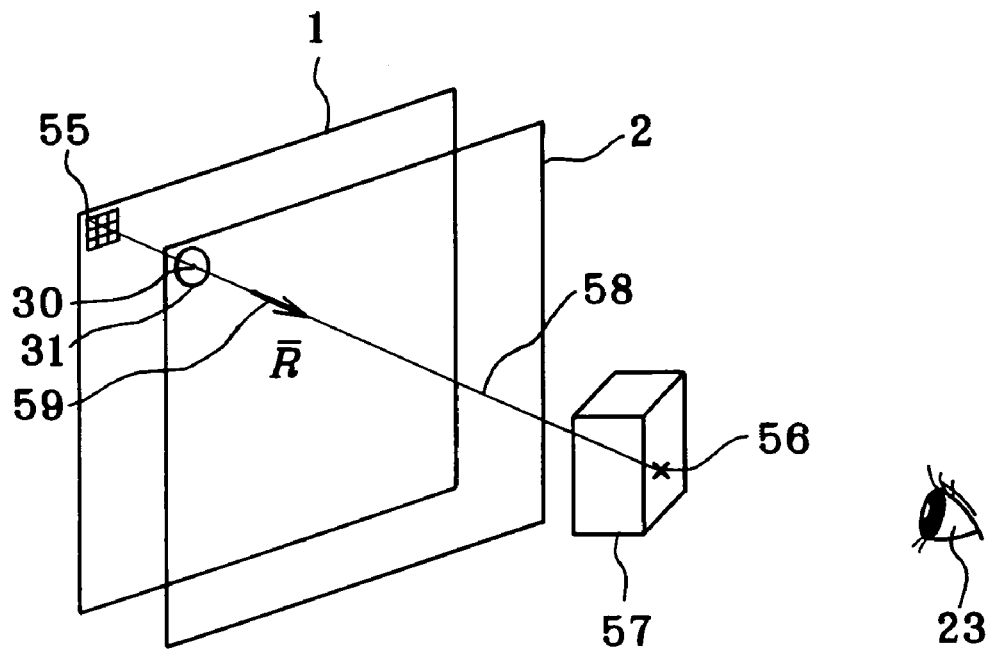
FIG. 9 is to explain ray tracing for generating an image for stereoscopic display.

First, the ray 58 to be displayed on the pixel 55 can be obtained from the lens center 30 to match with the pixel 55 on the display 1 as shown in FIG. 9 from the lens-pixel matching positional relation data 15. A unit vector R in the direction of the ray is designated as 59.

Next, attention is given on the pixel 61 on the multiple viewpoint image in FIG. 10 to match with the pixel 55. The unit vector opposite to the projecting direction of each viewpoint j is defined as $r_j$. Interpolation calculation is performed, which strongly reflects the values of the pixel closest to 59 of the unit vector R, and a pixel value P to be displayed on the pixel 55 is obtained. When pixel value of the pixel 61 at the viewpoint j is defined as $P_j$, it is obtained by the following formula 5:

$$P = \frac{\sum_j \{(\bar{R} \cdot \bar{r}_j) P_j\}}{\sum_j (\bar{R} \cdot \bar{r}_j)}$$ [Formula 5]

According to the present embodiment, it is possible to decrease the calculation procedure necessary for the generation of the stereoscopic image compared with the case of Embodiment 1, and a CPU with lower processing ability can be used.

In the present embodiment, parallel projection is used for the rendering from 3D data, while perspective projection may be used. In such case, the unit vector $r_j$ opposite to the projecting direction at each pixel on the multiple viewpoint image should be obtained from the rendering condition in each case.

In this case, the unit vector $r_j$ opposite to the projecting direction should be stored together with the multiple viewpoint image, and this contributes to the reduction of calculation procedure (calculation amount) when the stereoscopic image is generated.

Embodiment 3

As Embodiment 3, description will be given below on a case where the stereoscopic image is generated by approximately using interpolation (Step S11) from the multiple viewpoint image data 17 acquired by image-taking at multiple viewpoints (Step S9) using a multi-camera in the flow chart of FIG. 3 by referring to FIG. 11.

Figure 11:
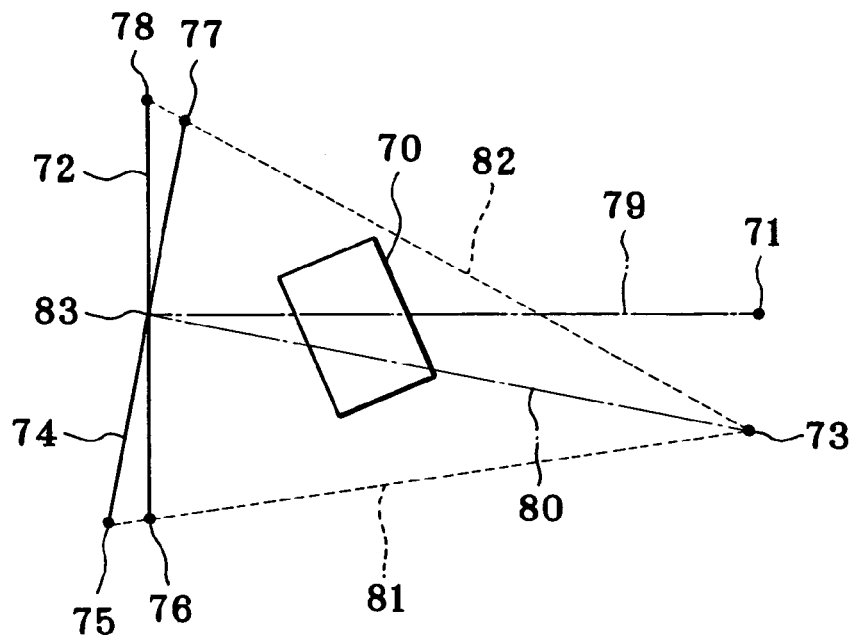
FIG. 11 is a cross-sectional view when camera images are taken at multiple viewpoints.

In order to facilitate the explanation on the image-taking in Step S9 of FIG. 3, description will be given now on a model, in which an object 70 shown in FIG. 11 is taken by two cameras.

For each of the cameras, distortion is corrected in advance, and it is assumed that the image is taken as perspective projection from the ideal viewpoint. It is assumed that the ideal viewpoint of the camera at a standard camera position is 71 and an optical axis is 79. The projection plane is regarded as 72 from the field angle of the camera, and it is supposed that the surface of the object 70 closer to the ideal viewpoint is projected.

In contrast to this camera, an image from another viewpoint is taken by a camera, of which the optical axis passes through a point 83 on the optical axis 79, and it is supposed that the ideal viewpoint is 73, the optical axis is 80, and projection plane is 74. The images projected on the projection planes 72 and 74 are stored as multiple viewpoint image data 17 from different viewpoints respectively.

In this case, the image-taking information is also stored. In the present embodiment, it is assumed that field angle of the camera, number of pixels, position of the ideal point in standard coordinate, and direction of the optical axis are all stored as the image-taking information.

Next, in the generation of the stereoscopic image from multiple viewpoints in Step S11 of FIG. 3, the image on the projection plane 72 when the image is taken at the standard camera position is regarded as the standard, and the image is to be displayed over the entire screen of display. In this case, the image projected on the projection plane 74 is projected on the projection plane 72.

For instance, in the present embodiment, as the position to match with the position of each pixel on the projection plane 72, pixel values corresponding to the position of 75 along the ray 81 connecting with the ideal viewpoint 73 of the camera is projected with respect to the point 76 on the projection plane 72.

Similarly, regarding the point 78, a pixel value corresponding to the position of the point 77 on the ray 82 is projected. In this case, the points 75 and 77 on the projection plane 74 are not necessarily on the lattice point of the pixel coordinate, and the pixel value is determined by interpolation. An image obtained by projecting the image of the projection plane 74 is called as "an image from another viewpoint after projection".

Next, directions of the rays 81 and 82 used when pixels on the projection plane 74 are projected on the projection plane 72 are stored as ray vectors. Similarly, the pixels on the plane 72, serving as standard projection plane, are also stored as ray vectors for the direction of the ray connecting each pixel with the ideal viewpoint 71.

In the above, description has been given on a case where two cameras are used, while image may be taken by using more than two cameras. It is desirable to take images at many viewpoints equal to or more than the number of pixels on the display to be assigned to one lens. Also, if the object to be taken is a still object, images at two or more viewpoints may be taken by moving a single camera.

Here, it is supposed that a ray vector stored to match with the pixels at a certain position of the viewpoint j is vector $r_j$, and the value of pixel is $P_j$. Further, data are obtained from the lens-pixel matching positional relation data 15 by using the relation of the position of each pixel on the display and the lens center. It is supposed that the ray vector for stereoscopic display at each pixel is vector R.

Then, the position of the pixel on the standard projection plane concurs with the position of the pixel of the display. By using the calculation shown in the formula 5 in Embodiment 2, a stereoscopic image can be generated, in which the pixel value in the ray direction closest to the ray vector R is reflected well.

In this case, however, depending on the position of the camera used for image-taking in Step S9 of FIG. 3, the pixel value of the pixel in question is often not determined in "the image from another viewpoint after projection" of the viewpoint j. In such case, it should be excluded from the calculation.

At the position of the camera to take image in Step S9 of FIG. 3, the ideal viewpoint may be arranged in circular shape or in spherical shape with the center at a certain point, or it may be placed in any direction as desired, and it may be placed in parallel. The number of pixels and visual field angle of each camera may be different, and "the image from another viewpoint after projection" may be generated in association with the projection plane used as the standard.

In the present embodiment, the image-taking range of the image taken at the standard camera position is displayed over the entire screen of the display, while only a part of the image-taking range may be displayed on the display.

According to the present embodiment, it is possible to provide stereoscopic display not only in CG but also a stereoscopic display of actual image-taking to match with the positional relation between the lens and the pixel.

Embodiment 4

As another method to take images of multiple viewpoints in Step S9 of FIG. 3, the method described in the following reference may be used: B. Javidi, F. Okano: "Three-Dimensional Television, Video, and Display Technology", p. 118, Springer (2002), and multiple visual image may be taken by placing a lens array in front of a camera.

In this case, with the lens array installed, the direction of the ray to be projected on each pixel on the projection plane of the camera should be determined in advance. Also, a mechanism may be provided, which can change positional relation of lens array and camera, and image may be taken to match with the change of the position of the viewpoint. As a result, images can be taken at many more viewpoints. The amount of this change should be less than the pixel width of the pickup image to be assigned to one lens when converted to the surface of the pickup image.

According to the present embodiment, resolution of the image taken is decreased depending on the number of pixels of camera per each lens installed in front of the camera, while it is possible to efficiently take the images at two or more viewpoints by a single camera.

Embodiment 5

Regarding Step S4 to estimate positional relation of lens and pixel from the image taken in FIG. 3 of Embodiment 1, description will be given below on another embodiment when the display 1 is an ordinary type liquid crystal display comprising sub-pixels of RGB or a display such as plasma display by referring to FIG. 12.

It is supposed that each pixel of the display 1 comprises sub-pixels of RGB, and that non-light-emitting area (or non-transmissive area) such as a black mask is placed between the sub-pixels. Attention is given on the lens 91 within the lens array 2, and it is supposed that the ray connecting the ideal viewpoint E (40 in FIG. 12) of camera and the lens center is 92, and that the distribution of brightness values on the projection plane of the camera is given as 90.

In case the lens 91 is an ideal lens and a distance between the lens array 2 and the display 1 is equal to focal length of the lens 91, the black mask should be displayed over the entire surface of the region of the lens 91. In reality, however, the lens 91 has aberration. Also, in case of liquid crystal display, the ray of the backlight passes through the portion of the black mask to some extent. As a result, actual distribution is as shown by 90.

Figure 12:
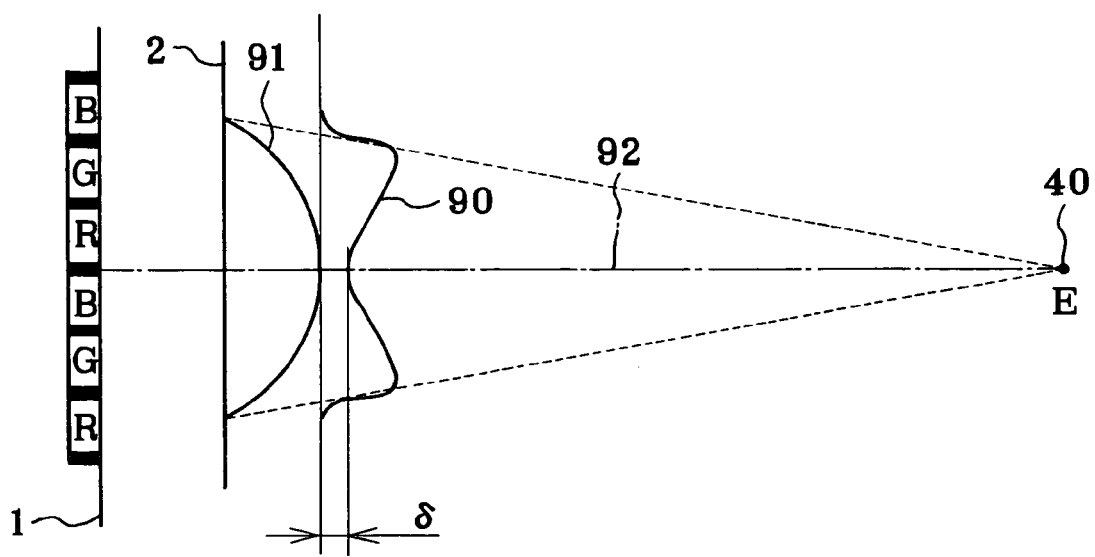
FIG. 12 is a drawing to explain brightness distribution on a display where RGB sub-pixels and black mask are present.

Therefore, when the intersection of the ray 92 and the display 1 is a non-light-emitting area as shown in FIG. 12, the image taken by the camera would be darker even when the entire screen of the display 1 is displayed in white.

For this reason, in case the number of connected pixels (n) exceeding the threshold value in Step 23 of FIG. 5 is less than the number of pixels (N) to match with one lens, the lens region may not be detected or a single lens region may be detected as two lens regions.

In this respect, after the position of the lens center has been estimated in Step S25 of FIG. 5, the spacing between the adjacent lenses should be checked (Step S30). If it is less than ½ of the lens spacing as designed or if it is more than 3/2 (Step S31), go back to Step S24 again, and set up the threshold value again. In Steps S22, S23 and S30 after Step S31, calculation may not be made for the regions, in which it is determined that the lens spacing is closer to the design value.

According to the present embodiment, even when an ordinary type liquid crystal display is used, the lens-pixel matching positional relation data can be generated.

Embodiment 6

As the deviation of positional relation between lens and pixel, deviation caused when the lens array 2 is mounted on the display 1 or shrink caused by temperature of the lens array 2 may be considered. In this case, it is assumed that the spacing of lenses is equal, and description is given now by referring to FIG. 13, FIG. 14 and FIG. 15 on an embodiment where the lens-pixel matching positional relation data is generated at high speed.

Figure 13:
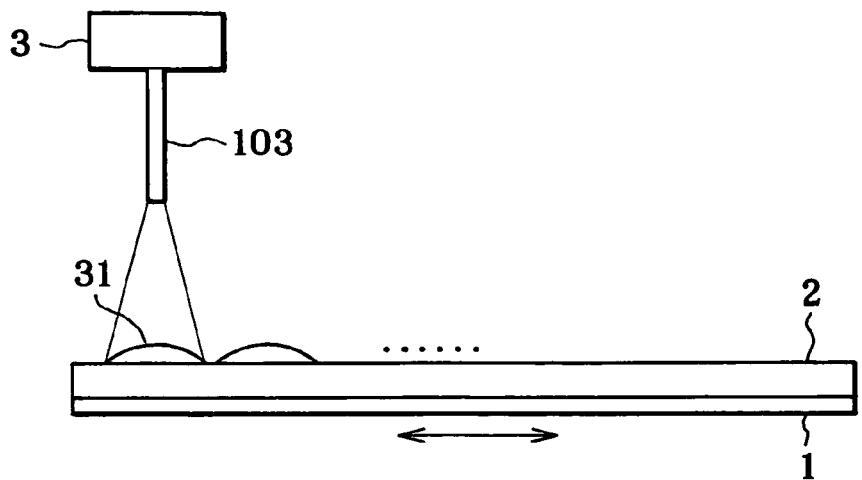
FIG. 13 is a drawing to show an example of image-taking in the flow chart shown in FIG. 15.

In the present embodiment, it is assumed that lens spacing is uniform and even, and positional relations of lenses at four corners and the pixels are determined. The remaining values can be obtained by interpolation. For this purpose, the camera 3 is mounted on a microscope 103 as shown in FIG. 13, and image is taken in such manner that only one lens is within visual field.

For instance, the camera 3 and the microscope 103 are fixed so as to be perpendicular to the stereoscopic displays 1 and 2.

The stereoscopic displays 1 and 2 are moved in parallel, and image is taken so that the lens center at the corner of the lens array 2 comes to the center.

Under the condition where environmental light is present, it is easy to identify the lens region, and positioning can be performed automatically. In this way, in the present embodiment, positional relation between the pixels of the display and the images taken by camera is not identified, but positional relation between lens center and the image taken by camera is known, and the positional relation between the lens center and the pixel can be obtained.

Figure 14:
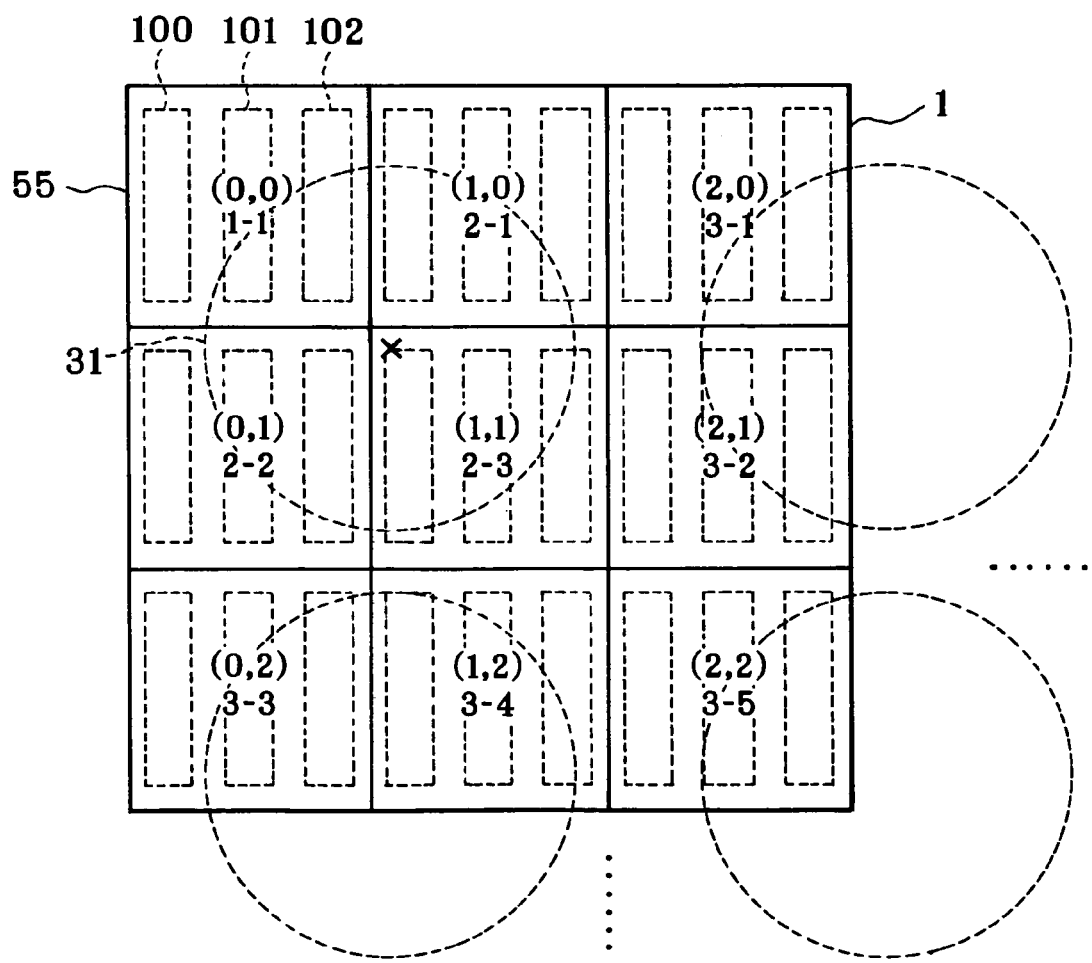
FIG. 14 shows a relation of lens centers and pixels in the flow chart of FIG. 15.

FIG. 14 is an enlarged view of a part of the stereoscopic display. Coordinates of the pixels 55 of the display 1 are given as (0,0), (1,0), . . . (1,2) and (2,2), and the position of the center of the lens 31 is on upper left of the pixel of (1,1).

It is supposed that pixels of the display 1 comprise sub-pixels of RGB and that red pixel is 100, green pixel is 101, and blue pixel is 102.

Figure 15:
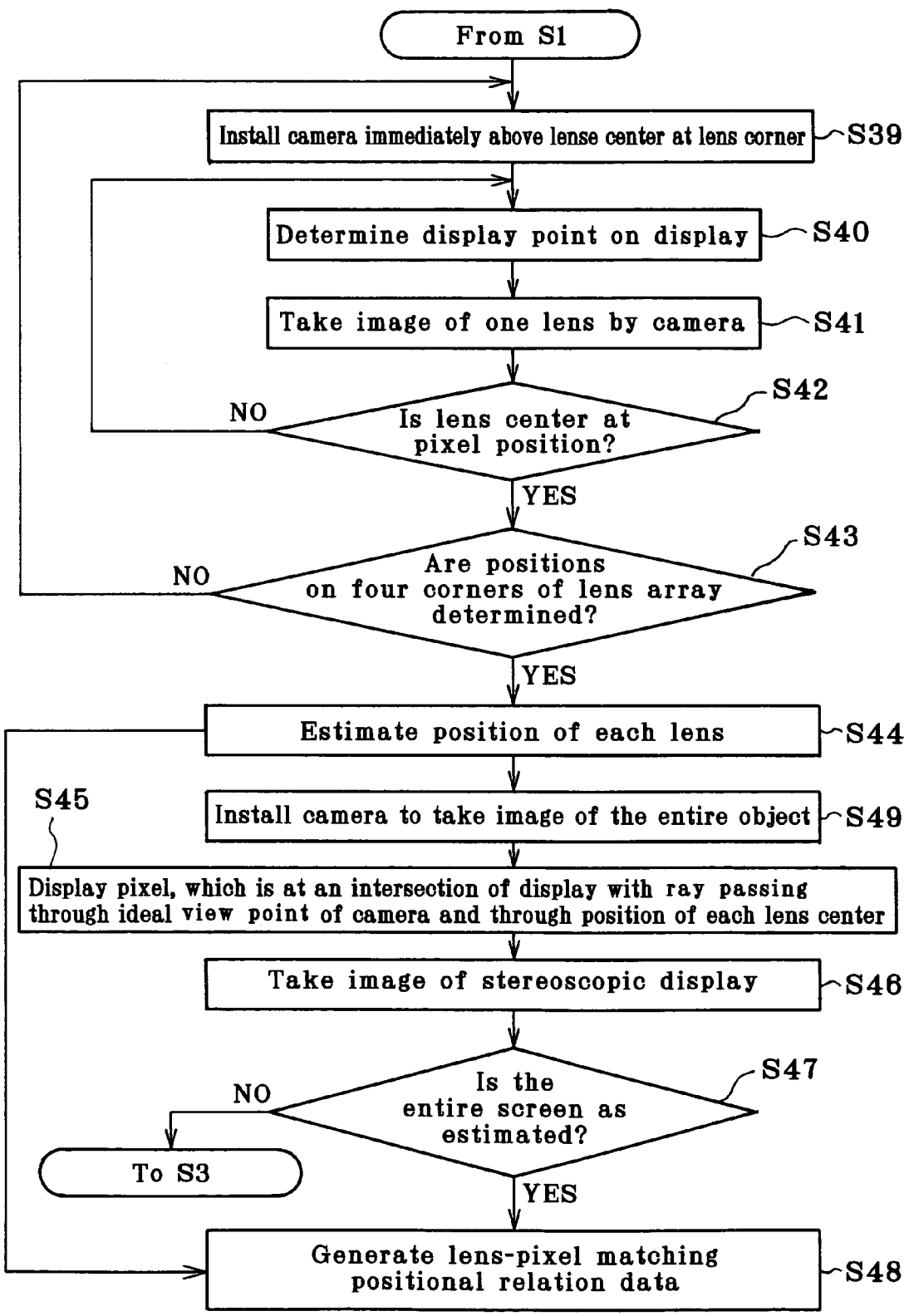
FIG. 15 is a flow chart of a processing to generate positional relation information on lens-pixel matching by a method different from the method shown in FIG. 3.
Figure 16:
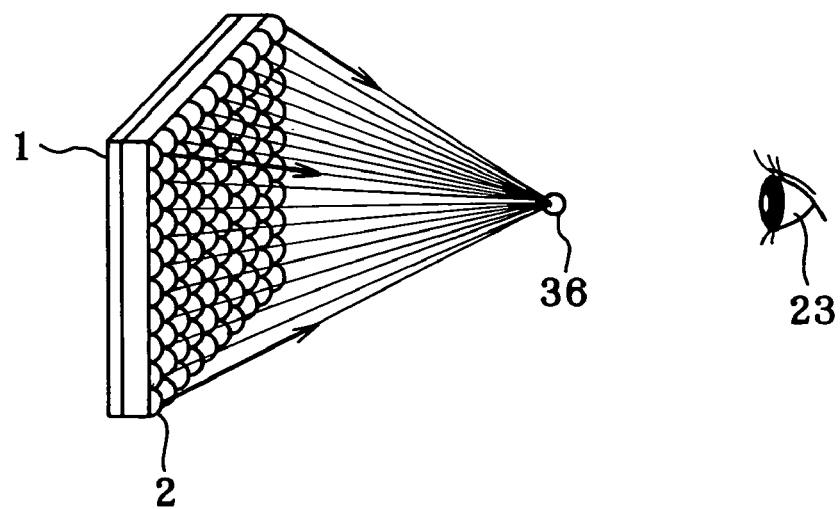
FIG. 16 is a 3-dimensional view showing the principle of stereoscopic display of IP mode.
Figure 17:
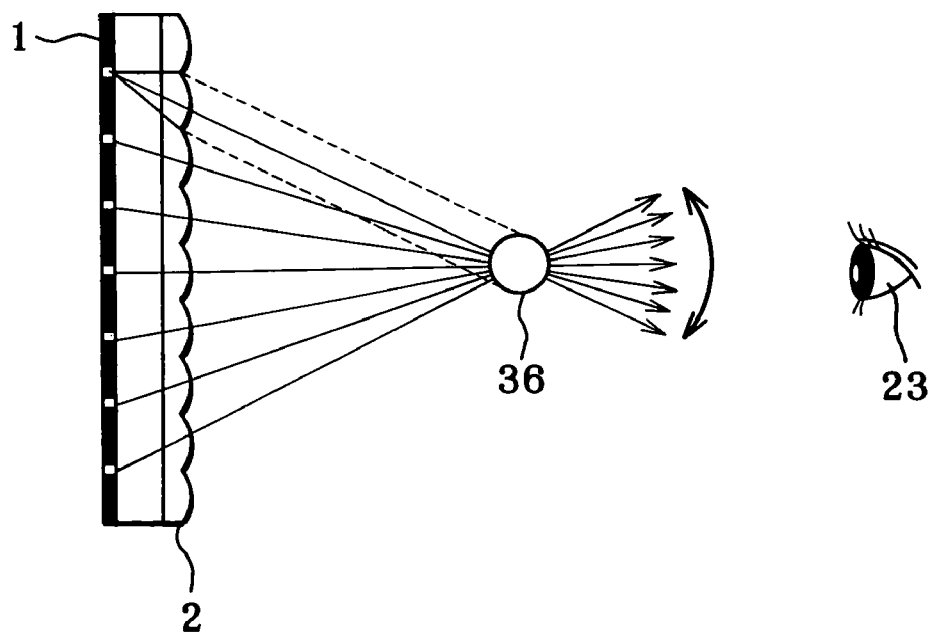
FIG. 17 is a 2-dimensional view of a cross-section in FIG. 16.

Now, description will be given on the flow of processing by referring to FIG. 15. First, when distortion of camera is corrected in Step S1 of FIG. 3 by using a device shown in FIG. 13, the positional relation of the camera and the display is set to perpendicular position, and the position of the stereoscopic display is adjusted so that the lens 31 at the corner of the lens array comes to the center of the image taken (Step S39).

Next, the pixels displayed on the display are determined (Step S40). For instance, when it is wanted to obtain the center of the lens at upper left shown in FIG. 14, pixels are displayed one after another so that the pixels are spread one by one from upper left corner of the display.

In the case shown in FIG. 14, numerics written under the coordinate values indicate rank and order of the pixels displayed. The pixel (0,0) is the first in display rank. The pixels (1,0), (0,1), (1,1) are the second in the rank and are identical to each other, and the number after hyphen indicates the order of display among the pixels of the same rank.

For the pixels of the same rank, it is determined to display all of them at the time when the pixels to be displayed are determined in Step S40. In Step S41, these are displayed in the order and images are taken. The color to be displayed on the pixels is white, and it is supposed that each sub-pixel is displayed with the same brightness.

Next, in Step S42, it is checked whether or not the position of the pixel matching with the lens center can be determined to the image taken so far. The position of the pixel to match with the lens center is determined as given below:

Among all of the images taken by the same pixels of the same display rank, the pixel with the highest brightness is determined. Maximum brightness of display rank k is defined as Pk. The changing of P is checked, and if no maximal value is present, it is assumed that the lens center may not be determined yet. Then, go back to Step S40. Therefore, the display must be performed at least to the third rank.

If the maximal value is present, it can be speculated that the lens center may be present within the region of the pixel displayed when the maximal value is taken. Thus, the images adjacent to the pixel (in FIG. 14, the pixel (1,1)) are also used (8 pixels in the surrounding in case of FIG. 14), the position of the pixel to match with the lens center is obtained by the following procedure:

First, color of the position of the center is obtained from each image taken in Step S41. The symbol I is put to the display pixel taking the maximal value and to the pixels around these pixels sequentially (in FIG. 14, I is given as 0 to 8), and it is supposed that the color at the position of the center of the image taken when the pixel I is displayed is separated to R, G and B, and that these colors are designated a $R_i$, $B_i$ and $B_i$.

It is supposed that the spacing between pixels is q in the case as shown in FIG. 14 when coordinates of the pixel i are $(x_i, y_i)$. Then, the coordinates of R, G and B of the pixel are given as: $(x_i-q/3, y_i)$ for R, $(x_i, y_i)$ for G, and $(x_i+q/3, y_i)$ for B respectively.

The center of the image taken by the camera should have a color, which is closest to the color of the lens center. By taking the weighted average using the position of the displayed pixel and the color of the image taken, position of the pixel corresponding to the position of the lens center is obtained by the following formula 6:

$$\left( \frac{\sum_i \left\{ R_i\left(x_i - \frac{q}{3}\right) + G_i x_i + B_i\left(x_i + \frac{q}{3}\right) \right\}}{\sum_i (R_i + G_i + B_i)}, \frac{\sum_i \left\{ R_i\left(y_i - \frac{q}{3}\right) + G_i y_i + B_i\left(y_i + \frac{q}{3}\right) \right\}}{\sum_i (R_i + G_i + B_i)} \right)$$ [Formula 6]

In case the pixels are not divided to sub-pixels such as the case of field sequential type, only the brightness and the information of coordinates of the pixel center should be used.

After the position of the pixel matching with the lens center has been obtained as described above, it is checked whether or not all values have been obtained on lenses at four corners of the lens array 2 (Step S43). If all values are not obtained yet, go back to Step S39.

If all values have been obtained, the lenses therebetween are interpolated according to the matching of positional relation between lenses at four corners and the pixels, and positional relation of lens and pixel is estimated (Step S44). Then, the lens-pixel matching positional relation data is generated (Step S48).

In the interpolation in Step S44, number of lenses in the lens array can be used, and interpolation can be conducted by supposing that the lenses are arranged with equal spacing. If it already known from the manufacturing method of the lens array that lens spacing is narrowed down to some extent as it comes closer to the center of the lens array or if other features are already known, interpolation may be performed to match with such features.

As described above, according to the present embodiment, it is possible to efficiently generate the lens-pixel matching positional relation data. Even in case the spacing between lenses is short or in case there is no spacing, the lens-pixel matching positional relation data can be easily obtained.

Embodiment 7

In order to obtain the lens-pixel matching positional relation information more accurately in Embodiment 6, the procedure from Step S39 to Step S42 may be repeated for all lenses. In such case, however, much time may be required. In this respect, description will be given now on a case where the lens-pixel matching positional relation information can be determined more accurately without requiring much time referring to FIG. 15.

In this embodiment, the procedures up to Step S44 are the same as in Embodiment 6.

Next, a camera, which can take the image of the entire stereoscopic display, is installed perpendicularly at the center of the stereoscopic display (Step S49). In this case, it is supposed that the positional relation between camera and display is already known.

Based on the lens-pixel matching positional relation information estimated in Step S44, a pixel on the display is displayed, which comes across the ray connecting the ideal viewpoint of camera with the lens center. In this case, display may be made in white or the sub-pixel closest to the intersection is displayed to provide higher accuracy (Step S45).

The entire stereoscopic display is taken by the camera (Step S46). It is confirmed whether or not display is performed as estimated for each lens over the entire screen (Step S47). If it is exactly as estimated, advance to Step S48. If it is not so, go to Step S3 of FIG. 3, and the lens-pixel matching positional relation information is generated by the estimation procedure of Embodiment 1.

In this case, for the region where the matching between lens and pixel is correct, there is no need to perform the processing to obtain the lens region in Step S4 of FIG. 3.

According to the present embodiment, processing can be carried out with the same high efficiency as in Embodiment 6 and with the same high accuracy as in Embodiment 1.

According to the present invention, it is possible to use an inexpensive lens with relatively low accuracy in lens pitch by obtaining the lens-pixel matching positional relation information. If the positional accuracy when the lens array and the display are integrated with each other is within a certain range, correct stereoscopic display can be attained. Thus, it is possible to provide the effects to absorb individual difference between the stereoscopic displays and to facilitate the production.

What is claimed is:

1. An autostereoscopic display, comprising a display for displaying an image and a lens array where a plurality of lenses are provided to match with a plurality of images of said display, wherein:

a stereoscopic image generating/outputting system is provided to generate a stereoscopic image by using a lens-pixel matching positional relation information to indicate as to which position of the image of the display the center of each lens in said lens array matches with; and the stereoscopic image generated by said stereoscopic image generating/outputting system is displayed on said display, wherein an image is taken on a part of the display and the lens array integrated with each other at a position where optical axis of the camera concurs with optical axis of each lens by using a camera of distortion correctable type, a matching positional relation of a part of the lenses and the pixels is obtained by using a plurality of the pickup images by changing position of the pixel to be displayed on the display, and, for the remaining lenses, the information is obtained by interpolation from the lens-pixel matching positional relation of said part of the lenses.

2. An autostereoscopic display according to claim 1, wherein the lens-pixel matching positional relation information is obtained by a processing to take an image of the display and the lens array integrated with each other by a camera of distortion correctable type and to estimate positional relation of the display and the pickup image from external configuration of the display, and also by a processing to estimate each lens center of the lens array from the pickup image, wherein said stereoscopic image generating system generates a stereoscopic image by using said lens-pixel matching positional relation information based on image data from multiple viewpoints and by interpolation based the image data from multiple viewpoints closest to position and direction of the ray passing through each pixel and each lens center.

3. An autostereoscopic display according to claim 2, wherein said lens-pixel matching positional relation information is recorded in a nonvolatile memory for each display, and a stereoscopic image is generated by acquiring said lens-pixel matching positional relation information from the display at the stereoscopic image generating system.

4. An autostereoscopic display according to claim 2, wherein said lens-pixel matching positional relation information is recorded on a storage medium independent from the display for each display, and said stereoscopic image generating system acquires said lens-pixel matching positional relation information via said storage medium.

5. An autostereoscopic display according to claim 1, wherein said stereoscopic image generating system generates a stereoscopic image by obtaining information on color and brightness at a point closest to an observer among 3-dimensional objects on the ray passing through each pixel and each lens center from 3-dimensional data by utilizing said lens-pixel matching positional relation information.

6. An autostereoscopic display according to claim 1, wherein said lens-pixel matching positional relation information is recorded in a nonvolatile memory for each display, and a stereoscopic image is generated by acquiring said lens-pixel matching positional relation information from the display at the stereoscopic image generating system.

7. An autostereoscopic display according to claim 1, wherein said lens-pixel matching positional relation information is recorded on a storage medium independent from the display for each display, and said stereoscopic image generating system acquires said lens-pixel matching positional relation information via said storage medium.

8. An autostereoscopic display according to claim 1, wherein only the pixels taken through each lens are displayed when image is taken by a camera of distortion correctable type by using the lens-pixel matching positional relation information obtained by said interpolation, there are a step to take image by camera and a step to detect a region where the pixels do not match correctly, and for the region not correctly matching, the lens-pixel matching positional relation information is obtained again by a processing to take an image of the display and the lens array integrated with each other using a camera of correctable distortion type, and to estimate positional relation between the display and the pickup image from external configuration of the display, and also by a processing to estimate each lens center of the lens array from the pickup image.

9. A stereoscopic image generating system, comprising a display for displaying images and a lens array where a plurality of lens to match with a plurality of pixels of said display are provided and for displaying a stereoscopic image on said display, wherein:

a stereoscopic image is generated by using a lens-pixel matching positional relation information to indicate as to which position of the pixel of the display the center of each lens of said lens array matches with, a stereoscopic image is generated by interpolation based on image data from multiple viewpoints closest to position and direction of a ray passing through each pixel and each lens center by utilizing said lens-pixel matching positional relation information based on image data from multiple viewpoints.

10. A method for generating a stereoscopic image to display the stereoscopic image on a display in a system, which comprises a display for display images and a lens array where a plurality of lenses to match with a plurality of pixels of said display are arranged, said method comprising steps of:

generating said stereoscopic image by using the lens-pixel matching positional relation information as to which position of the pixel of the display the center of each lens of the lens array matches with; and generating a stereoscopic image by interpolation of image data from multiple viewpoint closest to position and direction of a ray passing through each pixel and each lens center by using said lens-pixel matching positional relation information based on image data from multiple viewpoint.

* * * * *